United States Patent [19]

Kohda

[11] Patent Number: 5,446,292
[45] Date of Patent: Aug. 29, 1995

[54] METHOD AND APPARATUS FOR RECORDING AND READING RADIATION IMAGES

[75] Inventor: Katsuhiro Kohda, Kanagawa, Japan

[73] Assignee: Fuji Photo Film Co., Ltd., Kanagawa, Japan

[21] Appl. No.: 155,556

[22] Filed: Nov. 22, 1993

[30] Foreign Application Priority Data

Nov. 20, 1992 [JP] Japan .................... 4-311808

[51] Int. Cl.$^6$ .............................................. G03B 42/02
[52] U.S. Cl. ...................................... 250/585; 250/582
[58] Field of Search ............................ 250/582, 585

[56] References Cited

U.S. PATENT DOCUMENTS

| | | |
|---|---|---|
| 4,258,264 | 3/1981 | Kotera et al. . |
| 4,276,473 | 6/1981 | Kato et al. . |
| 4,315,318 | 2/1982 | Kato et al. . |
| 4,346,295 | 8/1982 | Tanaka et al. . |
| 4,369,367 | 1/1983 | Horikawa . |
| 4,387,428 | 6/1983 | Ishida et al. . |
| 4,543,479 | 9/1985 | Kato . |
| 4,947,046 | 8/1990 | Kawabata et al. ............... 250/484.4 |

FOREIGN PATENT DOCUMENTS

| | | | |
|---|---|---|---|
| 56-11395 | 2/1981 | Japan . | |
| 56-12599 | 2/1981 | Japan . | |
| 61-5193 | 2/1986 | Japan . | |
| 63-200025 | 8/1988 | Japan | 250/484.4 |
| 5-10892 | 1/1993 | Japan | 250/582 |

*Primary Examiner*—Constantine Hannaher
*Attorney, Agent, or Firm*—Sughrue, Mion, Zinn, Macpeak & Seas

[57] ABSTRACT

A stimulable phosphor sheet is exposed to radiation carrying image information of an object, and a radiation image of the object is thereby stored on the stimulable phosphor sheet. The stimulable phosphor sheet is then exposed to stimulating rays, which cause the stimulable phosphor sheet to emit light in proportion to the amount of energy stored thereon during its exposure to the radiation. The emitted light is photoelectrically detected, and an image signal representing the radiation image is thereby obtained. When the stimulable phosphor sheet is exposed to the radiation, the stimulable phosphor sheet is located such that it may make an angle falling within the range of 5 degrees to 60 degrees with respect to a plane, which is normal to the direction of travel of the radiation carrying the image information of the object. The image signal, which has been obtained by photoelectrically detecting the light emitted by the stimulable phosphor sheet, is corrected in accordance with the angle.

14 Claims, 9 Drawing Sheets

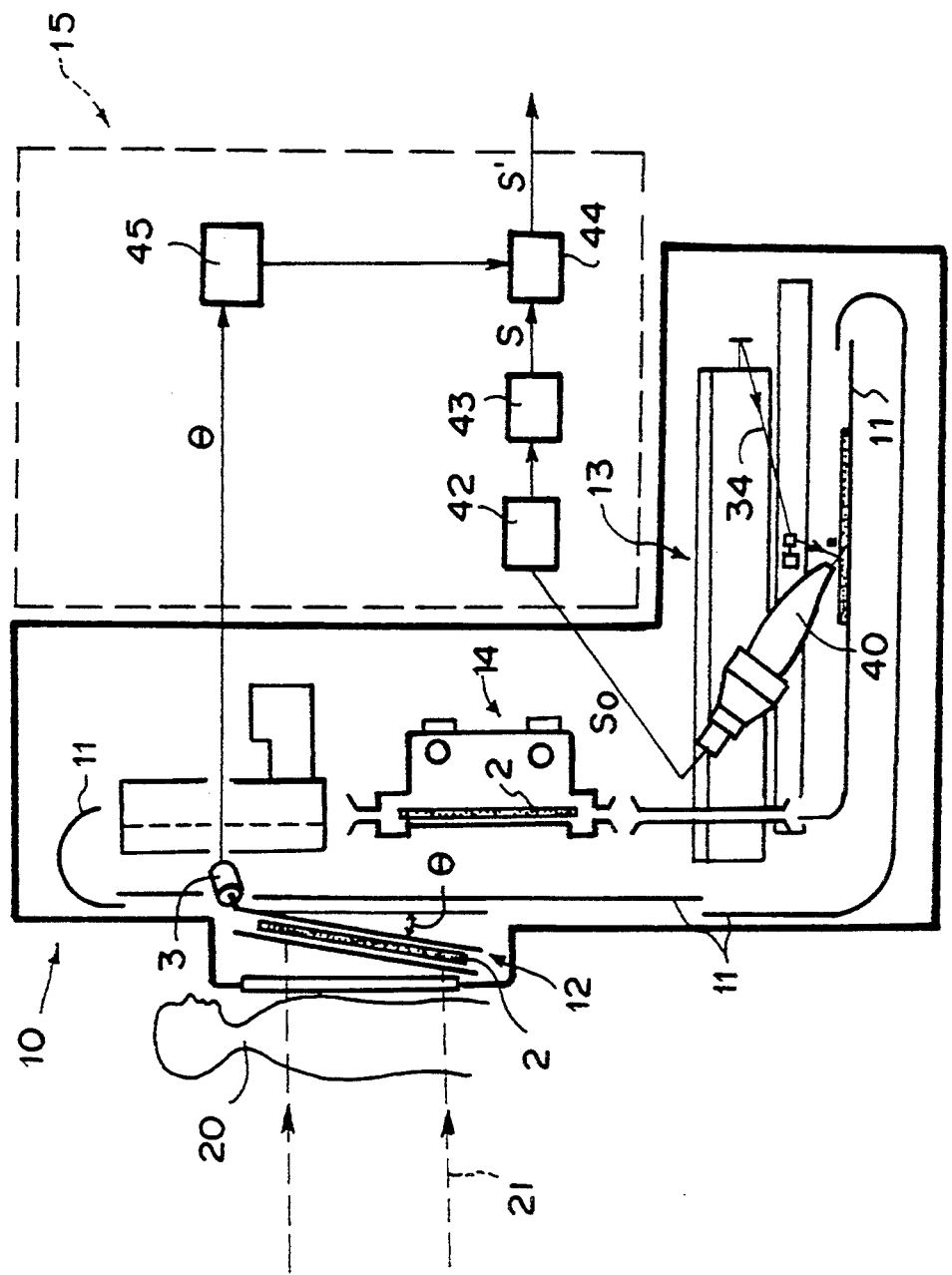

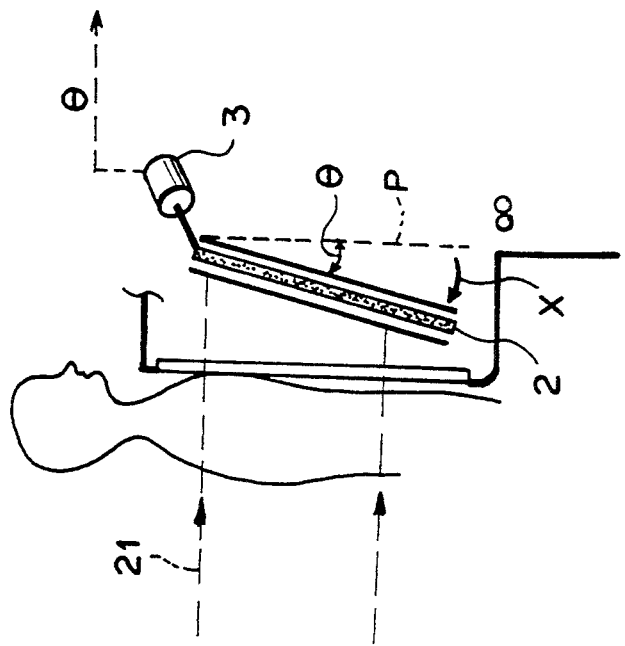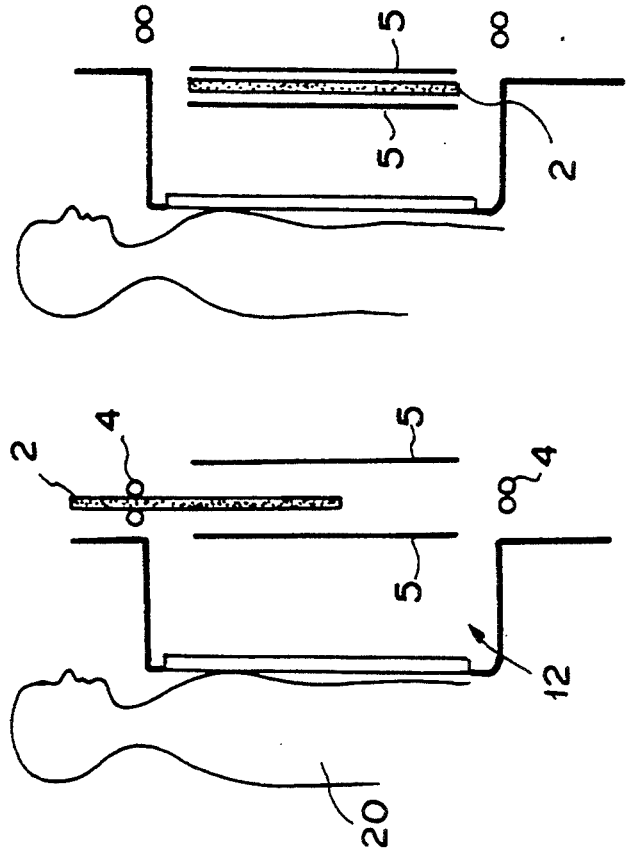

VIEW M

VIEW N

VIEW M'

METHOD AND APPARATUS FOR RECORDING AND READING RADIATION IMAGES

BACKGROUND OF THE INVENTION

1. Field of the Invention

This invention relates to a method and apparatus for recording and reading out a radiation image. This invention particularly relates to a method and apparatus for recording and reading out a radiation image, with which a visible radiation image of an object having good image quality with enhanced sharpness and enhanced graininess is obtained.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a photocopy, or the like. In this manner, a visible image having good image quality with high contrast, high sharpness, high graininess, or the like, can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, 4,543,479, and Japanese Unexamined Patent Publication No. 56(1981)-11395, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order for the desired image density to be obtained, an appropriate read-out gain is set when the emitted light is being detected and converted into an electric signal (image signal) to be used in the reproduction of a visible image on a recording material, such as photographic film, or on a display device, such as a CRT display device.

In the radiation image recording and reproducing systems described above, when a radiation image of an object is recorded on a stimulable phosphor sheet, the stimulable phosphor sheet is ordinarily located such that it may extend in a direction which is normal to the direction of travel of the radiation carrying image information of the object.

It is desired that the radiation images obtained with the aforesaid radiation image recording and reproducing systems, or the like, have good image quality and can serve as effective tools in, particularly, the efficient and accurate diagnoses of illnesses.

Such that a radiation image having good image quality may be obtained, it is considered to increase the thickness of the stimulable phosphor layer of the stimulable phosphor sheet.

Specifically, if the thickness of the stimulable phosphor layer of the stimulable phosphor sheet is increased, a larger amount of radiation can be absorbed by the stimulable phosphor layer, and a larger amount of energy can thereby be stored on the stimulable phosphor layer during the image recording operation. As a larger amount of energy is stored on the stimulable phosphor layer, a larger amount of light can be emitted by the stimulable phosphor layer when it is exposed to stimulating rays during the next image read-out operation. As a result, a visible image having higher contrast and higher graininess can be reproduced from the image signal obtained by guiding and detecting the emitted light.

However, when the stimulating rays are irradiated to the stimulable phosphor layer having an increased thickness, the stimulating rays are diffused in accordance with the thickness of the stimulable phosphor layer. Therefore, the sharpness of the visible image reproduced from the image signal, which is obtained by guiding and detecting the light thus emitted by the surface of the stimulable phosphor layer, becomes low. Accordingly, an image having good image quality cannot be obtained.

SUMMARY OF THE INVENTION

The primary object of the present invention is to provide a radiation image recording and read-out method, wherein the amount of radiation absorbed by a stimulable phosphor sheet during an image recording operation is increased, and a visible radiation image having high sharpness and high graininess is thereby obtained.

Another object of the present invention is to provide an apparatus for carrying out the radiation image recording and read-out method.

The present invention provides a radiation image recording and read-out method, wherein a stimulable phosphor sheet is exposed to radiation carrying image information of an object, a radiation image of the object is thereby stored on the stimulable phosphor sheet, the stimulable phosphor sheet is then exposed to stimulating rays, which cause the stimulable phosphor sheet to emit light in proportion to the amount of energy stored thereon during its exposure to the radiation, and the emitted light is photoelectrically detected, an image signal representing the radiation image being thereby obtained, the radiation image recording and read-out method comprising the steps of:

i) locating the stimulable phosphor sheet such that it may make an angle falling within the range of 5 degrees to 60 degrees, both inclusive, with respect to a plane, which is normal to the direction of travel of the radiation carrying the image information of the object, when the stimulable phosphor sheet is exposed to the radiation, and ii) correcting the image signal, which has been obtained by photoelectrically detecting the light emitted by the stimulable phosphor sheet, in accordance with the angle.

The present invention also provides a first radiation image recording and read-out apparatus provided with:

i) a support material, ii) at least a single stimulable phosphor sheet, which is secured to the support material and is capable of storing a radiation image thereon, iii) an image recording section, in which the stimulable phosphor sheet is exposed to radiation carrying image information of an object, a radiation image of the object being thereby stored on the stimulable phosphor sheet, iv) an image read-out section, which is provided with:

a) a stimulating ray source for producing stimulating rays to be irradiated to the stimulable phosphor sheet, on which the radiation image was stored in the image recording section, the stimulating rays causing the stimulable phosphor sheet to emit light in proportion to the amount of energy stored thereon during its exposure to the radiation, and b) a photoelectric read-out means for detecting the emitted light and obtaining an image signal representing the radiation image, v) a means for circulating and moving the stimulable phosphor sheet, which is secured to the support material, with respect to the image read-out section by repeatedly moving the support material with respect to the image read-out section, and vi) an erasing section, in which energy remaining on the stimulable phosphor sheet after the image signal has been obtained therefrom in the image read-out section is released before a next radiation image is stored on the stimulable phosphor sheet, wherein the improvement comprises the provision of:

a) a sheet support means for supporting the stimulable phosphor sheet secured to the support material in the image recording section such that the stimulable phosphor sheet may make a predetermined angle falling within the range of 5 degrees to 60 degrees, both inclusive, with respect to a plane, which is normal to the direction of travel of the radiation carrying the image information of the object, and b) a correction means for correcting the image signal, which has been obtained from the image read-out section, in accordance with the predetermined angle.

The present invention further provides a second radiation image recording and read-out apparatus provided with:

i) a stimulable phosphor sheet composed of a plate-like support material and a stimulable phosphor layer, which is overlaid on the surface of the support material and is capable of storing a radiation image thereon, ii) an image recording section, which is located facing the stimulable phosphor sheet and in which the stimulable phosphor sheet is exposed to radiation carrying image information of an object, a radiation image of the object being thereby stored on the stimulable phosphor sheet, iii) an image read-out section, in which an image read-out operation is carried out and which is provided with:

a) a stimulating ray source for producing stimulating rays to be irradiated to the stimulable phosphor sheet, on which the radiation image has been stored, the stimulating rays causing the stimulable phosphor sheet to emit light in proportion to the amount of energy stored thereon during its exposure to the radiation, and b) a photoelectric read-out means for detecting the emitted light and obtaining an image signal representing the radiation image, iv) a reciprocating movement means for reciprocally moving the stimulable phosphor sheet with respect to the image read-out section such that the image read-out operation can be carried out repeatedly in the image read-out section, and v) an erasing section, in which energy remaining on the stimulable phosphor sheet after the image signal has been obtained therefrom in the image read-out section is released before a next radiation image is stored on the stimulable phosphor sheet, wherein the improvement comprises the provision of:

a) a sheet support means for supporting the stimulable phosphor sheet in the image recording section such that the stimulable phosphor sheet may make a predetermined angle falling within the range of 5 degrees to 60 degrees, both inclusive, with respect to a plane, which is normal to the direction of travel of the radiation carrying the image information of the object, and b) a correction means for correcting the image signal, which has been obtained from the image read-out section, in accordance with the predetermined angle.

The present invention still further provides a third radiation image recording and read-out apparatus, wherein the second radiation image recording and read-out apparatus in accordance with the present invention is modified such that the image recording section carries out the image recording operation on the stimulable phosphor sheet from one surface side of the support material, and the image read-out section carries out the image read-out operation from the other surface side of the stimulable phosphor sheet.

The present invention also provides a fourth radiation image recording and read-out apparatus, wherein the third radiation image recording and read-out apparatus in accordance with the present invention is modified such that the stimulable phosphor sheet is kept stationary at a fixed position, and the image read-out section is moved reciprocally with respect the stimulable phosphor sheet, the image read-out operation being thereby carried out. Alternatively, the image read-out section may be kept stationary at a fixed position, and the stimulable phosphor sheet may be moved reciprocally with respect to the image read-out section, the image read-out operation being thereby carried out.

The present invention further provides a fifth radiation image recording and read-out apparatus comprising:

i) a circulation and conveyance means for conveying at least a single stimulable phosphor sheet, which is capable of storing a radiation image thereon, along a predetermined circulation path, ii) an image recording section, which is located in the circulation path and in which the stimulable phosphor sheet is exposed to radiation carrying image information of an object, a radiation image of the object being thereby stored on the stimulable phosphor sheet, iii) an image read-out section, which is located in the circulation path and provided with:

a) a stimulating ray source for producing stimulating rays to be irradiated to the stimulable phosphor sheet, on which the radiation image was stored in the image recording section, the stimulating rays causing the stimulable phosphor sheet to emit light in proportion to the amount of energy stored thereon during its exposure to the radiation, and b) a photoelectric read-out means for detecting the emitted light and obtaining an image signal representing the radiation image, and iv) an erasing section, which is located in the circulation path and in which energy remaining on the stimulable phosphor sheet after the image signal has been obtained therefrom in the image read-out section is released before a next radiation image is stored on the stimulable phosphor sheet, wherein the improvement comprises the provision of:

a) a sheet support means for supporting the stimulable phosphor sheet in the image recording section such that the stimulable phosphor sheet may make a predetermined angle falling within the range of 5 degrees to 60 degrees, both inclusive, with respect to a plane, which is normal to the direction of travel of the radiation carrying the image information of the object, and b) a correction means for correcting the image signal, which has been obtained from the image read-out section, in accordance with the predetermined angle.

The first to fifth radiation image recording and read-out apparatuses in accordance with the present invention may be modified such that the angle, which the stimulable phosphor sheet supported by the sheet support means makes with respect to the plane normal to the direction of travel of the radiation carrying the image information of the object, is variable within the range of 5 degrees to 60 degrees, both inclusive, an inclination angle detecting means detects the angle of the stimulable phosphor sheet supported by the sheet support means, and the correction means corrects the image signal in accordance with the angle, which has been detected by the inclination angle detecting means.

Specifically, the radiation image recording and read-out method and apparatuses in accordance with the present invention are characterized by inclining the stimulable phosphor sheet with respect to the plane, which is normal to the direction of travel of the radiation carrying the image information of the object. An object image, which has been enlarged in the direction of inclination of the stimulable phosphor sheet, is thereby stored on the stimulable phosphor sheet. Thereafter, the stimulable phosphor sheet, on which the image of the object has been stored, is exposed to the stimulating rays, and the image signal is obtained by reading out the object image stored on the stimulable phosphor sheet. The image signal is then subjected to a correcting process in which it is multiplied by the reciprocal of the magnification of the extension of the image along the direction of inclination of the stimulable phosphor sheet.

The term "correcting an image signal" as used herein means that the image signal is compensated for the extension of the image due to the inclination of the stimulable phosphor sheet with respect to the plane, which is normal to the direction of travel of the radiation carrying the image information of the object.

In the radiation image recording and read-out method and apparatuses in accordance with the present invention, when the stimulable phosphor sheet is exposed to the radiation, the stimulable phosphor sheet is located such that it may make an angle falling within the range of 5 degrees to 60 degrees, both inclusive, with respect to the plane, which is normal to the direction of travel of the radiation carrying the image information of the object. This means that the stimulable phosphor sheet is rotated around at least either one of two axes, which intersect perpendicularly to each other in the plane normal to the direction of travel of the radiation carrying the image information of the object, such that the stimulable phosphor sheet may make an angle falling within the range of 5 degrees to 60 degrees, both inclusive, with respect to the plane, which is normal to the direction of travel of the radiation.

As will be understood from the specification, it should be noted that the term "moving a stimulable phosphor sheet with respect to an image read-out section" as used herein means movement of the stimulable phosphor sheet relative to the image read-out section, and embraces both the cases wherein the stimulable phosphor sheet is moved while the image read-out section is kept stationary, and cases wherein the image read-out section is moved while the stimulable phosphor sheet is kept stationary.

With the radiation image recording and read-out method and apparatuses in accordance with the present invention, the stimulable phosphor sheet is located at an angle of inclination $\theta$ (degrees) with respect to the plane, which is normal to the direction of travel of the radiation. The stimulable phosphor sheet is then exposed to the radiation, which carries image information of an object and has a spatial frequency f (cycle/mm). In this manner, an object image, which has been enlarged to a size $1/\cos \theta$ times the size of an original image (i.e. an image of the same object, which will be stored on the stimulable phosphor sheet in cases where the stimulable phosphor sheet is located parallel to the plane normal to the direction of travel of the radiation and is exposed in this state to the radiation) in the direction of inclination of the stimulable phosphor sheet, is thereby stored on the stimulable phosphor sheet.

If the true thickness of the stimulable phosphor layer of the stimulable phosphor sheet is equal to d, the apparent thickness d' of the stimulable phosphor layer of the stimulable phosphor sheet inclined at an angle $\theta$, which thickness is taken in the direction of travel of the radiation, will be equal to $1/\cos\theta$ times the true thickness d. Therefore, when the stimulable phosphor sheet is inclined at an angle $\theta$ and exposed to the radiation, the stimulable phosphor layer of the stimulable phosphor sheet can absorb substantially the same amount of radiation energy as a stimulable phosphor layer having a thickness of $d/\cos\theta$.

The stimulable phosphor sheet, on which the radiation image has been stored, is exposed to the stimulating rays, such as a laser beam, which cause the stimulable phosphor sheet to emit light in proportion to the amount of energy stored thereon during its exposure to the radiation. The emitted light is photoelectrically detected along the surface of the stimulable phosphor sheet, and an image signal is thereby obtained.

As described above, the stimulable phosphor sheet has absorbed a substantially larger amount of radiation energy than when the stimulable phosphor sheet is not inclined with respect to the plane, which is normal to the direction of travel of the radiation. Therefore, when the stimulable phosphor sheet is exposed to the stimulating rays, it emits a larger amount of light than the stimulable phosphor sheet which was not inclined during the image recording operation. As a result, an image having enhanced contrast can be reproduced from the image signal detected from the stimulable phosphor sheet. Accordingly, a visible image having high graininess can be obtained.

Also, the image signal represents the image enlarged to a size $1/\cos\theta$ times the size of the original image in the direction of inclination of the stimulable phosphor sheet. Therefore, the image signal has a spatial frequency of $f \times \cos\theta$ (cycle/mm) along the surface of the stimulable phosphor sheet.

Thereafter, the image signal is subjected to the correcting process, with which the image enlarged to a size $1/\cos\theta$ times the size of the original image is reduced to the size of the original image (or to the same aspect ratio as that of the original image).

When the stimulating rays are irradiated to the stimulable phosphor sheet, they are diffused by the stimulable phosphor layer of the stimulable phosphor sheet. Therefore, unsharpness occurs in the radiation image, which is read out from the stimulable phosphor sheet. The amount of unsharpness can be quantitatively determined by the modulation transfer function (MTF) of the stimulable phosphor sheet with respect to the spatial frequency f and is generally used as a measure representing the sharpness.

Specifically, the sharpness of the image signal obtained from the radiation image can be represented by the modulation transfer function MTF($f \times \cos\theta$) with respect to the frequency $f \times \cos\theta$.

In conventional radiation image recording and read-out methods, the angle $\theta$ of a stimulable phosphor sheet with respect to the plane, which is normal to the direction of travel of radiation, is equal to 0 degree. In such cases, the sharpness can be represented by MTF(f). It is known that the function MTF(x) of a spatial frequency x is a monotonously decreasing function. Also, $f \times \cos\theta < f$. Therefore, the formula MTF(f) < MTF($f \times \cos\theta$) obtains. This means that the radiation image recording and read-out method in accordance with the present invention can yield an image having higher sharpness than the conventional radiation image recording and read-out methods.

As described above, with the radiation image recording and read-out method and apparatuses in accordance with the present invention, a visible radiation image having good image quality with enhanced sharpness and enhanced graininess can be obtained.

If the angle of inclination $\theta$ is smaller than 5 degrees, the effects of increasing the amount of radiation energy absorbed will be very small. If the angle of inclination $\theta$ is larger than 60 degrees, an image will be stored on the stimulable phosphor sheet such that the image may be inclined at a large angle with respect to the thickness direction of the stimulable phosphor layer. Therefore, when the image is read out along the surface of the stimulable phosphor layer, the image information, which is stored at and obtained from a portion shallow from the surface of the stimulable phosphor layer, and the image information, which is stored at and obtained from a portion deep from the surface of the stimulable phosphor layer, shift in position from each other, and a spread image is thereby obtained. Accordingly, the image quality of the obtained image cannot be kept high.

BRIEF DESCRIPTION OF THE DRAWINGS

FIG. 1 is a schematic view showing a first embodiment of the radiation image recording and read-out apparatus in accordance with the present invention, FIGS. 2A, 2B, and 2C are explanatory views showing how an image recording section in the first embodiment of FIG. 1 operates.

DESCRIPTION OF THE PREFERRED EMBODIMENTS

Figure 3A:
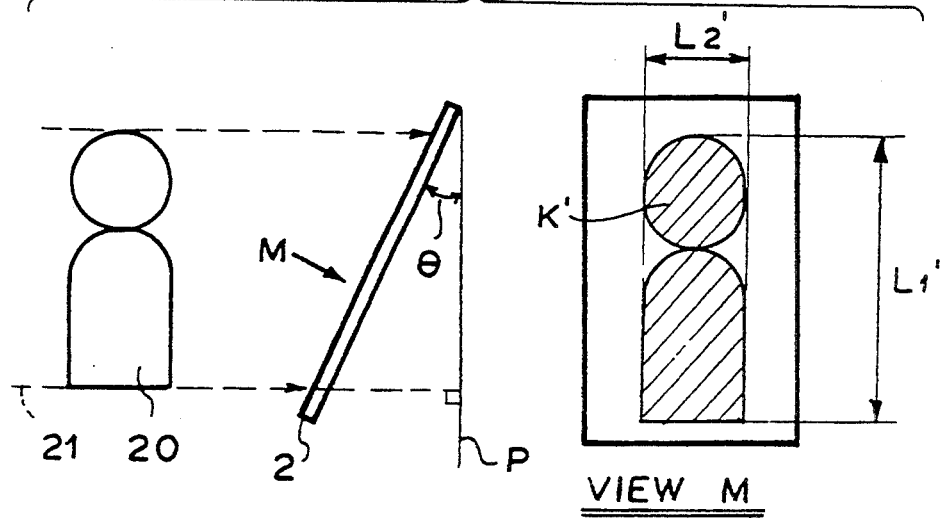
FIG. 3A is an explanatory view showing how an image K' is stored on a stimulable phosphor sheet.

The present invention will hereinbelow be described in further detail with reference to the accompanying drawings.

FIG. 1 is a schematic view showing a first embodiment of the radiation image recording and read-out apparatus in accordance with the present invention. FIGS. 2A, 2B, and 2C are explanatory views showing how an image recording section in the first embodiment of FIG. 1 operates. With reference to FIG. 1, a radiation image recording and read-out apparatus 10 comprises a circulation and conveyance means 11 for conveying at least a single stimulable phosphor sheet 2, which is capable of storing a radiation image thereon, along a predetermined circulation path. The radiation image recording and read-out apparatus 10 also comprises an image recording section 12, which is located in the circulation path and in which the stimulable phosphor sheet 2 is exposed to radiation 21 carrying image information of an object 20, a radiation image of the object 20 being thereby stored on the stimulable phosphor sheet 2. The radiation image recording and read-out apparatus 10 further comprises an image read-out section 13, which is located in the circulation path and provided with a stimulating ray source and a photoelectric read-out means. The stimulating ray source produces stimulating rays to be irradiated to the stimulable phosphor sheet 2, on which the radiation image was stored in the image recording section 12. The stimulating rays cause the stimulable phosphor sheet 2 to emit light in proportion to the amount of energy stored thereon during its exposure to the radiation 21. The photoelectric read-out means detects the emitted light and obtains an image signal representing the radiation image. The radiation image recording and read-out apparatus 10 still further comprises an erasing section 14, which is located in the circulation path and in which energy remaining on the stimulable phosphor sheet 2 after the image signal has been obtained therefrom in the image read-out section 13 is released before a next radiation image is stored on the stimulable phosphor sheet 2. The radiation image recording and read-out apparatus 10 also comprises a correction means for correcting the image signal, which has been obtained from the image read-out section 13, in accordance with an angle of inclination of the stimulable phosphor sheet 2.

Also, as illustrated in FIGS. 2A, 2B, and 2C, the image recording section 12 is provided with two sheet support means 5, 5 and an inclination angle detecting means 3. The sheet support means 5, 5 support the stimulable phosphor sheet 2, which has been conveyed by guide rollers 4 of the circulation and conveyance means 11 into the image recording section 12. The sheet support means 5, 5 also incline the stimulable phosphor sheet 2 to a position, which makes an angle of $\theta$ (wherein $5° \leq |\theta| \leq 60°$) with respect to the plane normal to the direction of travel of the radiation 21. The inclination angle detector 3 measures the angle of inclination $\theta$ of the stimulable phosphor sheet 2 and generates an electric signal representing the measured angle.

How this embodiment operates will be described hereinbelow.

As illustrated in FIG. 2A, the stimulable phosphor sheet 2 is conveyed by the guide rollers 4 of the circulation and conveyance means 11 into the image recording section 12. As illustrated in FIG. 2B, the stimulable phosphor sheet 2 is then sandwiched and supported by the two sheet support means 5, 5. Thereafter, as illustrated in FIG. 2C, the two sheet support means 5, 5 rotate in the direction indicated by the arrow X such that the stimulable phosphor sheet 2 may make an angle of $\theta$ with respect to the plane P, which is normal to the direction of travel of the radiation 21.

In this state, the radiation 21 is irradiated to the stimulable phosphor sheet 2 via an object 20, and an image K' is thereby stored on the stimulable phosphor sheet 2.

Also, when the radiation 21 is irradiated to the stimulable phosphor sheet 2, the inclination angle detector 3 detects the angle of inclination $\theta$ of the stimulable phosphor sheet 2 and generates the electric signal representing the detected angle.

The electric signal representing the detected angle $\theta$ is temporarily stored in a memory 45.

Figure 3B:
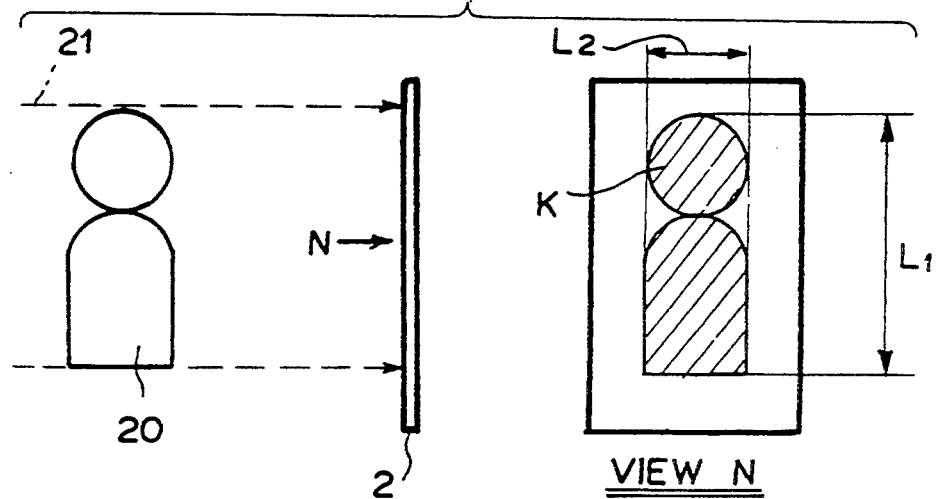
FIG. 3B is an explanatory view showing how an image K is stored on a stimulable phosphor sheet.

As illustrated in FIG. 3A, the image K', which has been enlarged in the longitudinal direction and has an aspect ratio of L2'/L1', is stored on the stimulable phosphor sheet 2, which makes an angle of $\theta$ with respect to the plane P normal to the direction of travel of the radiation 21. As illustrated in FIG. 3B, with a conventional technique, the stimulable phosphor sheet 2 is located parallel to the plane, which is normal to the direction of travel of the radiation 21. In such cases, if a radiation image of the same object as the object 20 shown in FIG. 3A is recorded on the stimulable phosphor sheet 2, an image K (hereinafter referred to as an original image K), which has an aspect ratio of L2/L1, will be stored on the stimulable phosphor sheet 2.

The relationship represented by the formula $L1'=L1/\cos\theta$ obtains between the lengths L1 and L1' of the original image K and the image K' which lengths are taken in the longitudinal direction. Also, the relationship represented by the formula $L2=L2'$ obtains between the lengths L2 and L2' of the original image K and the image K', which lengths are taken in the transverse direction. Specifically, the image K' has been enlarged to a size $1/\cos\theta$ times the size of the original image K in the longitudinal direction.

Figure 4A:
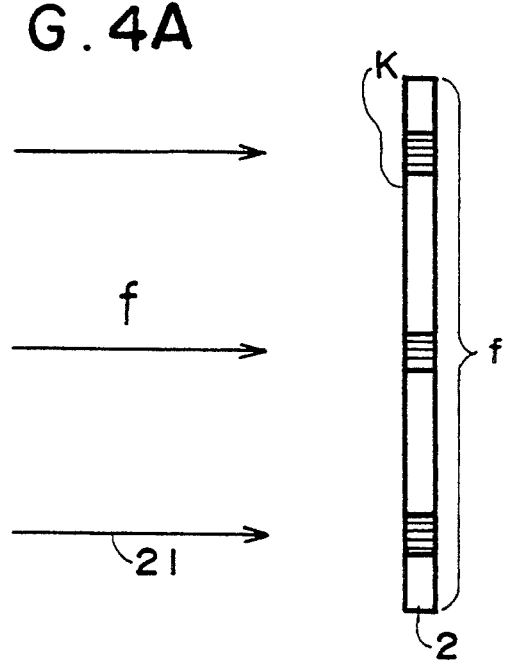
FIGS. 4A and 4B are explanatory views showing spatial frequencies of images stored on stimulable phosphor sheets.
Figure 4B:
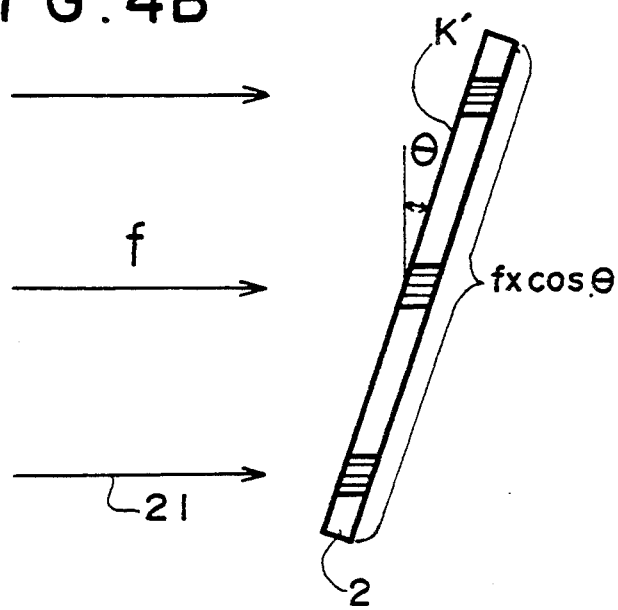

The radiation 21, which has passed through the object 20, may have a certain spatial frequency f (cycle/mm), wherein $0<f$, and the original image K and the image K' may be formed with the radiation 21. As illustrated in FIG. 4A, in cases where the image K is stored on the stimulable phosphor sheet 2, which is located parallel to the plane normal to the direction of travel of the radiation 21, the image K has the spatial frequency f (cycle/mm). Also, as illustrated in FIG. 4B, in cases where the image K' is stored on the stimulable phosphor sheet 2, which is located such that it may make an angle of $\theta$ with respect to the plane normal to the direction of travel of the radiation 21, the image K' has a spatial frequency $f \times \cos\theta$ (cycle/mm) along the primary surface of the stimulable phosphor sheet 2. The stimulable phosphor sheet 2, on which the image K' having the spatial frequency $f \times \cos\theta$ has been stored, is conveyed by the circulation and conveyance means 11 from the image recording section 12 to the image read-out section 13.

Figure 5:
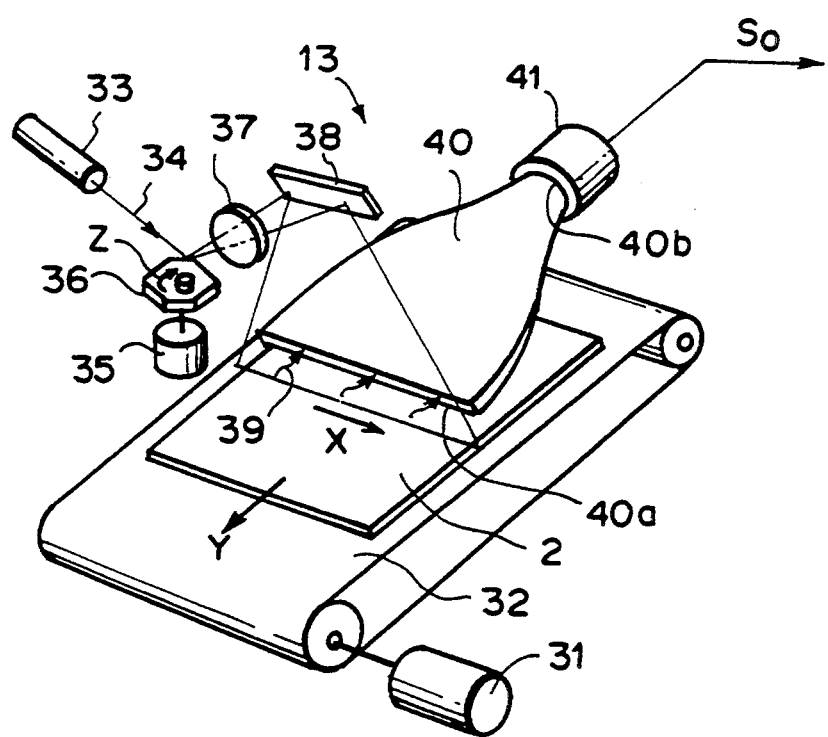
FIG. 5 is a perspective view showing an image read-out section in the first embodiment of FIG. 1.

FIG. 5 is a perspective view showing the image read-out section 13 in detail. As illustrated in FIG. 5, the stimulable phosphor sheet 2, which has been conveyed into the image read-out section 13, is set at a predetermined position in the image read-out section 13. The stimulable phosphor sheet 2 is then conveyed by an endless belt 32 in a sub-scanning direction indicated by the arrow Y. The endless belt 32 is driven by a motor 31. Also, a laser beam 34, which serves as stimulating rays, is produced by a laser beam source 33. The laser beam 34 is reflected and deflected by a rotating polygon mirror 36, which is quickly rotated by a motor 35 in the direction indicated by the arrow Z. The laser beam 34 passes through a converging lens 37, which may be constituted of an fθ lens, or the like. Thereafter, the direction of the optical path of the laser beam 34 is changed by a mirror 38, and the laser beam 34 impinges upon the stimulable phosphor sheet 2. In this manner, the laser beam 34 scans the stimulable phosphor sheet 2 in a main scanning direction indicated by the arrow X, which direction is approximately normal to the sub-scanning direction indicated by the arrow Y. When the stimulable phosphor sheet 2 is exposed to the laser beam 34, the exposed portion of the stimulable phosphor sheet 2 emits light 39 in an amount proportional to the amount of energy stored thereon during its exposure to the radiation. The emitted light 39 carrying the image information of the radiation image K' stored on the stimulable phosphor sheet 2 is guided by a light guide member 40 and photoelectrically detected by a photomultiplier 41, which serves as a photodetector. The photomultiplier 41 generates an analog output signal So. The analog output signal So is amplified by an amplifier 42 of a correction means 15. The amplified analog output signal So is then fed into an A/D converter 43, which samples the amplified analog output signal So with a predetermined scale factor and digitizes it into an image signal S.

As described above, the radiation image K', which is read out in the image read-out section 13, has been enlarged to a size $1/\cos\theta$ times the size of the original image K, which is obtained with the conventional radiation image recording and read-out method, in the longitudinal direction. Therefore, if the image signal S representing the enlarged image K' is directly used during the image reproduction in an image reproducing means, the problem will occur in that a visible image having been enlarged in the longitudinal direction is obtained.

Such that the aforesaid problem may be eliminated, the image signal S is fed into a signal converting means 44 for carrying out a correcting process. The signal converting means 44 reduces the image signal components of the image signal S corresponding to the direction, in which the image K' was enlarged to a size $1/\cos\theta$ times the size of the original image K, in accordance with the signal, which represents the angle of inclination d and is received from the memory 45.

Specifically, in the correcting process, the image signal components of the image signal S corresponding to the direction, in which the image K' was enlarged to a size $1/\cos\theta$ times the size of the original image K, are multiplied by $\cos\theta$. In this manner, the image K' is reduced to the same size as the size of the original image K.

With the correcting process, the image signal S is converted into a corrected image signal S', which represents an image having the same aspect ratio as that of the original image K. The corrected image signal S' is fed out of the signal converting means 44.

As will be described below, the image K' represented by the corrected image signal S' has high sharpness.

Specifically, the sharpness of an image can be quantitatively determined by the modulation transfer function MTF(x) of a spatial frequency x. The modulation transfer function MTF(x) represents the modulation transfer characteristics inherent to each stimulable phosphor layer. In this embodiment, the stimulable phosphor layer has the modulation transfer characteristics represented by the characteristic curve shown in FIG. 6.

Figure 6:
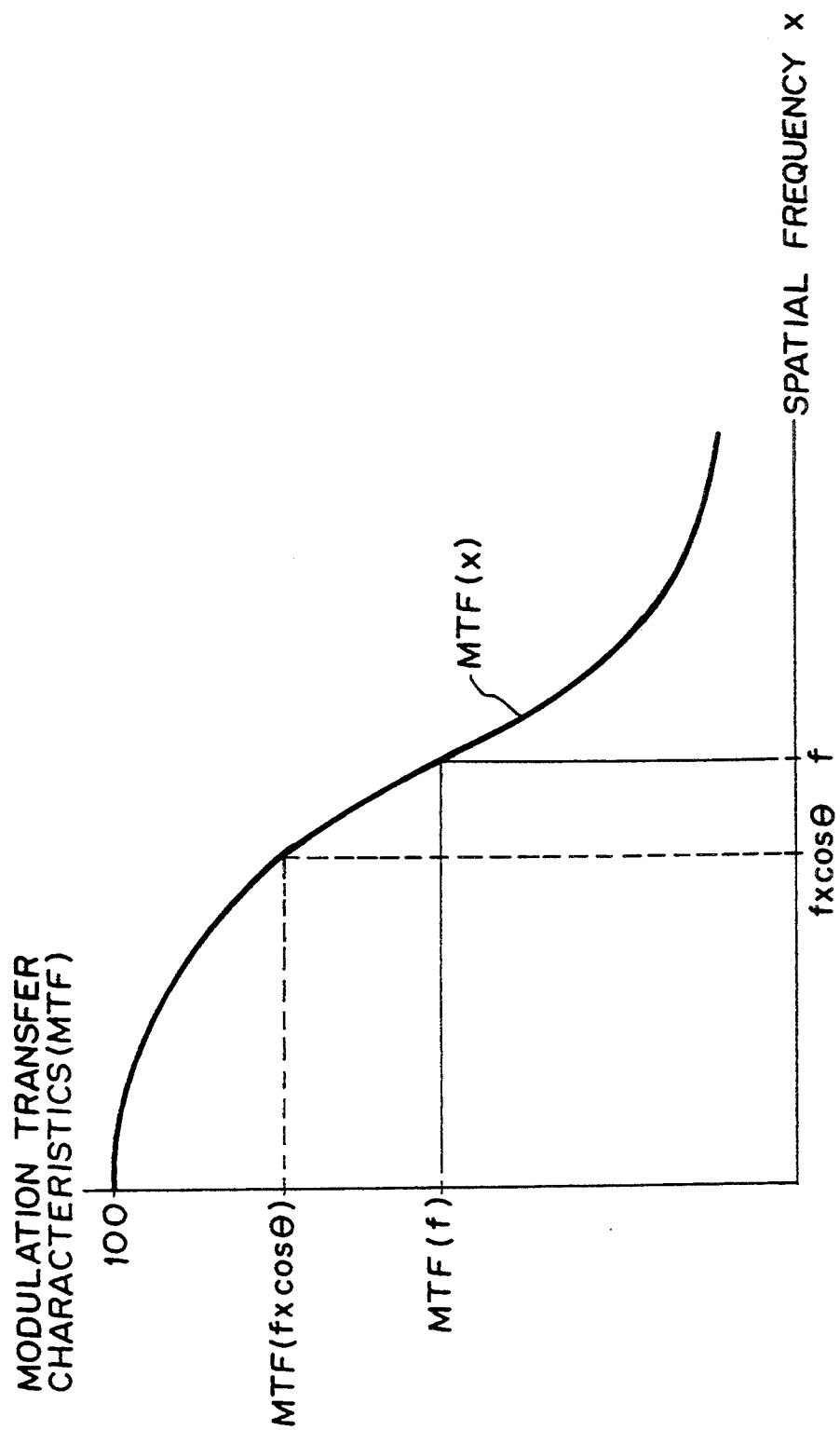
FIG. 6 is a graph showing a characteristic curve representing the modulation transfer characteristics (MTF) of a stimulable phosphor layer employed in the first embodiment of FIG. 1.

As described above, the image information having the spatial frequency f is stored on the stimulable phosphor sheet, which is located parallel to the plane normal to the direction of travel of the radiation during the image recording operation in accordance with the conventional radiation image recording and read-out method shown in FIG. 4A. As illustrated in FIG. 6, the sharpness of the image K represented by the image information is determined by MTF(f).

On the other hand, the image information stored on the stimulable phosphor sheet, which is inclined at an angle θ with respect to the plane normal to the direction of travel of the radiation during the image recording operation in accordance with the embodiment shown in FIG. 4B, has a spatial frequency $f \times \cos\theta$. Therefore, as illustrated in FIG. 6, the sharpness of the image K' represented by the image information is determined by $MTF(f \times \cos\theta)$.

In the conditions
$5° \leq |\theta| \leq 60°$
the formula
$\cos\theta < 1$
obtains. Therefore,
$f \times \cos\theta < f$ The modulation transfer function MTF(x) is a monotonously decreasing function, and therefore the formula $$MTF(f) < MTF(f \times \cos\theta)$$

obtains. Specifically, this formula indicates that the image, which is obtained with the radiation image recording and read-out method in accordance with the present invention wherein the stimulable phosphor sheet is inclined at an angle θ with respect to the plane normal to the direction of travel of the radiation during the image recording operation, has higher sharpness than the sharpness of the image, which is obtained with the conventional radiation image recording and read-out method wherein the stimulable phosphor sheet is not inclined during the image recording operation.

By way of example, the corrected image signal S' may be used in reproducing a visible image on photosensitive film, or the like, by using an image reproducing apparatus, such as a laser printer. In this manner, a visible image can be obtained which has better image quality with higher sharpness than the image reproduced from the image K in accordance with the conventional radiation image recording and read-out method.

Figure 7:
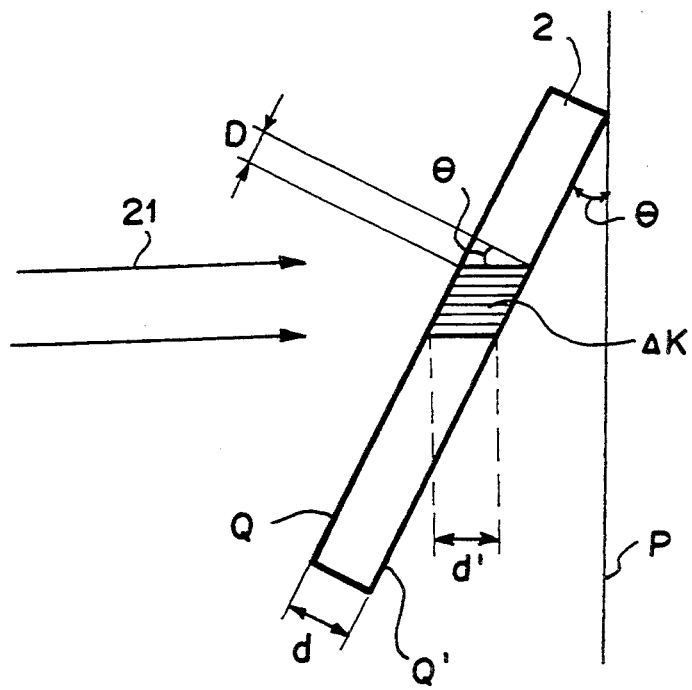
FIG. 7 is an explanatory view showing how an image is stored on a stimulable phosphor sheet.

Also, as illustrated in FIG. 7, in cases where the true thickness of the stimulable phosphor layer of the stimulable phosphor sheet 2 is equal to d, and the stimulable phosphor sheet 2 is inclined at an angle θ with respect to the plane, which is normal to the direction of travel of the radiation 21, the apparent thickness d' of the stimulable phosphor layer of the stimulable phosphor sheet 2, which thickness is taken in the direction of travel of the radiation 21, is equal to $d/\cos\theta$. Specifically, the thickness of the stimulable phosphor layer, which thickness is efficient for the absorption of energy from the radiation 21, increases to $1/\cos\theta$ times the true thickness d.

Therefore, the amount of radiation absorbed by the stimulable phosphor layer increases, and the amount of energy stored per unit area of the stimulable phosphor sheet 2, which unit area is taken along the primary surface Q, becomes large. Accordingly, during the image read-out operation, the amount of light emitted by the stimulable phosphor sheet 2 can be kept large with respect to the amount of energy of the stimulating rays, which are irradiated to the stimulable phosphor sheet 2. As a result, the contrast and the graininess of the image, which is reproduced from the image signal obtained from the image read-out operation, can be kept high.

When image information ΔK, which is stored at a small portion of the stimulable phosphor layer, is read out along the primary surface Q of the stimulable phosphor layer, spread (image spread) D occurs between the light, which is emitted by the primary surface (the upper surface) Q of the small portion carrying the image information ΔK, and the light, which is emitted by the lower surface Q' of the small portion carrying the image information ΔK. The image spread D is determined by the thickness d of the stimulable phosphor layer and the angle of inclination θ and may be represented by the formula d×tan θ. In general, such image spread will adversely affect the image quality of the image, which is reproduced from the image signal obtained from the image read-out operation.

However, in general, the practical range of the thickness d of the stimulable phosphor layer is approximately 200 μm, and the beam diameter of the stimulating rays irradiated to the stimulable phosphor layer is approximately 100 μm. If the angle θ is equal to 45 degrees, the image spread D will be equal to 200 μm×tan 45°, i.e. 200 μm.

Also, in general, under the conditions described above, the stimulating rays are diffused before they impinge upon the lower surface Q' of the stimulable phosphor layer. At the time at which the stimulating rays impinge upon the lower surface Q', the beam diameter of the stimulating rays will be equal to approximately 1 mm.

Therefore, the image spread described above is negligible with respect to the diffusion of the beam diameter of the stimulating rays. Also, the adverse effects of the image spread upon the image quality may be neglected.

As described above, with the radiation image recording and read-out apparatus in accordance with the present invention, when a radiation image is recorded on the stimulable phosphor sheet, the stimulable phosphor sheet is inclined at an angle θ with respect to the plane, which is normal to the direction of travel of the radiation. In this manner, a large amount of energy from the radiation can be stored on the stimulable phosphor sheet, and the graininess of the reproduced image can thereby be kept high. Also, the sharpness of the reproduced image can be kept high. As a result, the image quality of the reproduced image can be kept good.

In the radiation image recording and read-out apparatus in accordance with the present invention, the sheet support means 5 need not necessarily support the stimulable phosphor sheet 2 at the variable angle of inclination θ. Alternatively, for example, a sheet support means may be employed in which the angle θ is fixed at a predetermined angle θ1, where $5° \leq |θ| \leq 60°$. In the correction means 15, a correction value cos θ1 may be calculated from the predetermined angle θ1 and may be used during the correcting process. In such a modification, the inclination angle detector 3 need not be provided. Therefore, this modification is advantageous from the point of view of simplification in the structure of the apparatus and the correcting process.

Figure 8:
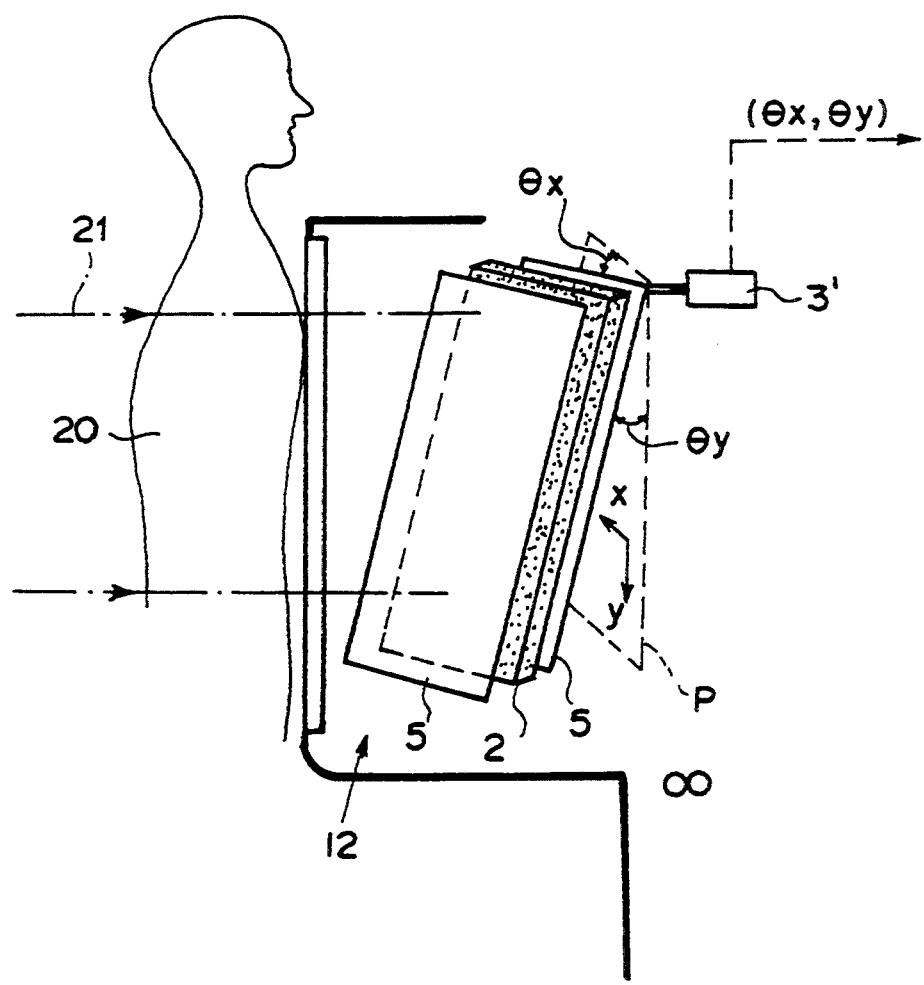
FIG. 8 is a schematic view showing an image recording section in a second embodiment of the radiation image recording and read-out apparatus in accordance with the present invention.

As another alternative, as illustrated in FIG. 8, the stimulable phosphor sheet 2 may be rotated and inclined such that it may make an angle of θx and an angle of θy, respectively, with respect to coordinate axes x and y, which intersect perpendicularly to each other in the plane P normal to the direction of travel of the radiation 21.

In such cases, a two-dimensional parallel angle detecting means 3', which is capable of measuring the angles of inclination θx and θy independently, may be employed in lieu of the inclination angle detector 3. Alternatively, two independent inclination angle detectors 3, 3 may be employed for the two axes x and y. The measured angles of inclination θx and θy are then converted into electric signals, and the electric signals are fed into the memory 45.

Figure 3C:
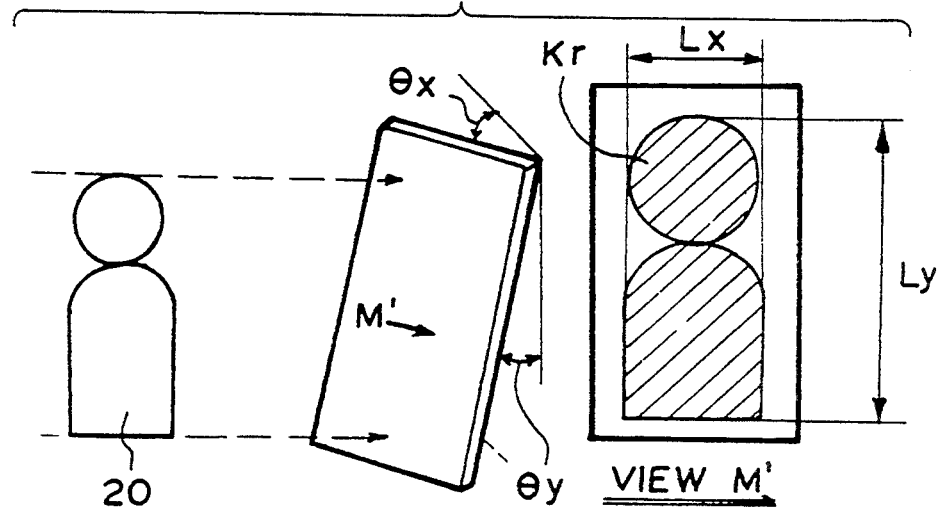
FIG. 3C is an explanatory view showing how an image Kr is stored on a stimulable phosphor sheet.

In the second embodiment of FIG. 8, an image Kr is stored on the stimulable phosphor sheet 2. As illustrated in FIG. 3C, the image Kr has a length Ly in the longitudinal direction and a length Lx in the transverse direction. The relationship expressed as Ly=L1/cos θy and the relationship expressed as Lx=L2/cos θx obtain between the image Kr and the original image K. Specifically, the image Kr has been enlarged to a size 1/cos θy times the size of the original image K in the longitudinal direction and to a size 1/cos θx times the size of the original image K in the transverse direction.

As in the first embodiment described above, with the second embodiment, the image reproduced on photosensitive film, or the like, by using a laser printer, or the like, has higher sharpness with respect to the longitudinal and transverse directions than the sharpness of the conventional image, which is obtained from the original image K. Also, the image obtained with the second embodiment has higher graininess than the graininess of the conventional image. Thus the image quality of the image obtained with the second embodiment can be kept better than the image quality of the conventional image.

In the embodiment of FIG. 1, the radiation image recording and read-out apparatus in accordance with the present invention is constituted as the sheet conveyance type in which the stimulable phosphor sheet is conveyed along the predetermined conveyance path. Alternatively, as disclosed in, for example, U.S. Pat. No. 4,543,479, the radiation image recording and read-out apparatus in accordance with the present invention may be constituted as the sheet securing type in which a stimulable phosphor sheet is secured to a support material, and the stimulable phosphor sheet secured to the support material is repeatedly moved with respect to an image read-out section. In cases where the radiation image recording and read-out apparatus in accordance with the present invention is constituted as the sheet securing type, an image recording section may be located at an angle of inclination θ with respect to the support material. Also, the image read-out section and an erasing section may be located parallel to the support material.

Figure 9:
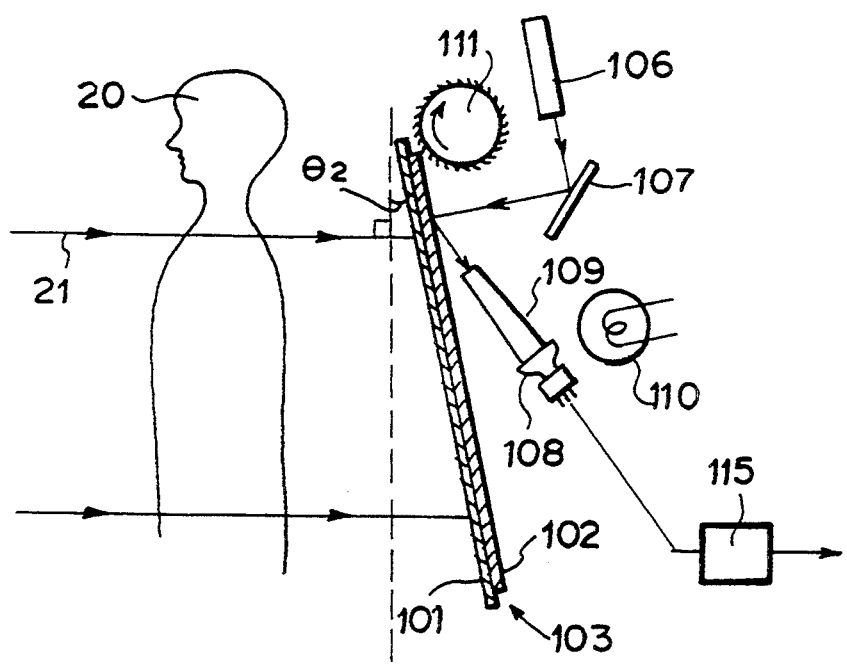
FIG. 9 is a schematic view showing a third embodiment of the radiation image recording and read-out apparatus in accordance with the present invention.

FIG. 9 is a schematic view showing a third embodiment of the radiation image recording and read-out apparatus in accordance with the present invention, which is constituted as the sheet securing type.

In this embodiment, a stimulable phosphor sheet 103 used to record a radiation image is composed of a stationary support material 101, which is constituted of a plate-like radiation-permeable material, and a stimulable phosphor layer 102 overlaid on the surface of the support material 101. The stimulable phosphor sheet 103 is inclined at a predetermined angle θ2, wherein $5° \leq |θ2| \leq 60°$, with respect to the plane, which is normal to the direction of travel of radiation 21 produced by a radiation source (not shown). The radiation 21 is irradiated to an object 20, which is positioned between the radiation source and the stimulable phosphor sheet 103. In this manner, a radiation image of the object 20 is projected through the support material 101 onto the stimulable phosphor layer 102 and stored on the stimulable phosphor layer 102. As in the first embodiment described above, the radiation image stored on the stimulable phosphor layer 102 has been enlarged in the direction, in which the stimulable phosphor sheet 103 is inclined at the angle $\theta 2$, as compared with an image, which is projected to the plane normal to the direction of travel of the radiation 21.

A stimulating ray source 106 for producing the stimulating rays is located facing the surface of the stimulable phosphor sheet 103 on the stimulable phosphor layer side. Also, a light deflector 107 for deflecting the stimulating rays, which have been produced by the stimulating ray source 106, in the width direction of the stimulable phosphor sheet 103, is located facing the surface of the stimulable phosphor sheet 103 on the stimulable phosphor layer side. Further, a photodetector 108 for detecting the light, which is emitted by the stimulable phosphor layer 102 when it is exposed to the stimulating rays, and a light guide member 109 for guiding the light emitted by the stimulable phosphor layer 102 are located facing the surface of the stimulable phosphor sheet 103 on the stimulable phosphor layer side. The stimulating ray source 106, the light deflector 107, the photodetector 108, and the light guide member 109 are mounted on a common stage (not shown). The photodetector 108 may be constituted by a head-on type of photomultiplier, a photoelectric amplification channel plate, or the like. The photodetector 108 photoelectrically detects the light, which is emitted by the stimulable phosphor layer 102 and guided by the light guide member 109. An image signal, which has been generated by the photodetector 108, is fed into the correction means 115, which corrects the image signal in accordance with the angle of inclination $\theta 2$ of the stimulable phosphor sheet 103.

The light guide member 109 may be of a material and a structure as disclosed in U.S. Pat. Nos. 4,346,295 and 4,369,367, and Japanese Unexamined Patent Publication No. 56(1981)-11395, and may be used in the manner disclosed therein. An erasing light source 110 is located facing the surface of the stimulable phosphor sheet 103 on the side of the stimulable phosphor layer 102. The aforesaid stage also supports a cylindrical cleaning roller 111 which is rotated by a drive unit (not shown) in the direction indicated by the arrow. The erasing light source 110 produces erasing light, which has wavelengths falling within the stimulation wavelength range for the stimulable phosphor layer 102. The erasing light is irradiated to stimulable phosphor layer 102 and releases the energy remaining thereon. The energy remaining on the stimulable phosphor layer 102 can also be released when the stimulable phosphor layer 102 is heated as disclosed in, for example, Japanese Unexamined Patent Publication No. 56(1981)-12599. Therefore, the erasing light source 110 may be replaced by a heating means.

The cleaning roller 111 rotates and moves while it is in contact with the surface of the stimulable phosphor sheet 103. The cleaning roller 111 thus removes dust from the surface of the stimulable phosphor layer 102 of the stimulable phosphor sheet 103. If necessary, the cleaning roller 111 may be constituted such that it can adhere dust by electrostatic attraction.

How this embodiment operates will be described hereinbelow. After the object 20 lies between the stimulable phosphor sheet 103 and the radiation source, the radiation 21 is irradiated to the stimulable phosphor sheet 103. In this manner, a radiation image of the object 20, which has been enlarged to a size $1/\cos \theta 2$ times the size of the original image, is stored on the stimulable phosphor layer 102 of the stimulable phosphor sheet 103. After the radiation image has been stored on the stimulable phosphor layer 102, the stimulating ray source 106 is activated to produce the stimulating rays, and the stimulable phosphor layer 102 is scanned with the stimulating rays. The stimulating rays are scanned by the light deflector 107 in the width direction of the stimulable phosphor sheet 103 (i.e. in the main scanning direction). Also, the stage, on which the stimulating ray source 106, the light deflector 107, the photodetector 108, the light guide member 109, and the cleaning roller 111 are mounted, is moved along the stimulable phosphor sheet 103 from an upper position to a lower position in FIG. 9. In this manner, the stimulable phosphor sheet 103 is also scanned with the stimulating rays in the vertical direction (i.e. in the sub-scanning direction). When the stimulable phosphor layer 102 is exposed to the stimulating rays, the stimulable phosphor layer 102 emits light in proportion to the amount of energy stored thereon during its exposure to the radiation. The emitted light is guided by the light guide member 109 and detected by the photodetector 108. An electric image signal representing to the radiation image stored on the stimulable phosphor layer 102 is thus generated by the photodetector 108.

As in the first embodiment described above, the image signal is multiplied by $\cos \theta 2$ in the correction means 115 and is thus corrected such that the image represented by the image signal may be reduced.

As in the first and second embodiments described above, the corrected image signal represents the image having high sharpness and high graininess.

When the stage is moved down in the sub-scanning direction, the cleaning roller 111 mounted on the stage is rotated to clean the surface of the stimulable phosphor layer 102. In this manner, dust, or the like, is removed from the surface of the stimulable phosphor layer 102. When the image read-out operation is finished, and the entire area of the surface of the stimulable phosphor layer 102 has been cleaned, the stage, on which the light deflector 107, the photodetector 108, and the like, are mounted, is returned to the waiting position that is above and spaced from the stimulable phosphor sheet 103. Thereafter, the erasing light source 110 is activated to produce the erasing light for a predetermined time, and the stimulable phosphor layer 102 is exposed to the erasing light. In this manner, energy, which remains on the stimulable phosphor layer 102 after the image signal has been obtained therefrom, is released.

Therefore, the radiation image, which remains on the stimulable phosphor layer 102 after the image signal has been obtained therefrom, is erased. In this manner, the cleaned and erased stimulable phosphor sheet 103 can be reused for the recording of a next radiation image.

In the aforesaid embodiment of FIG. 9, the sub-scanning in the image read-out operation is carried out by moving the stimulating ray irradiating system and the emitted light detecting system with respect to the stationary stimulable phosphor sheet 103. Alternatively, the stimulating ray irradiating system and the emitted light detecting system may be kept stationary at the image read-out zone, and the stimulable phosphor sheet may be moved in the sub-scanning direction.

Figure 10:
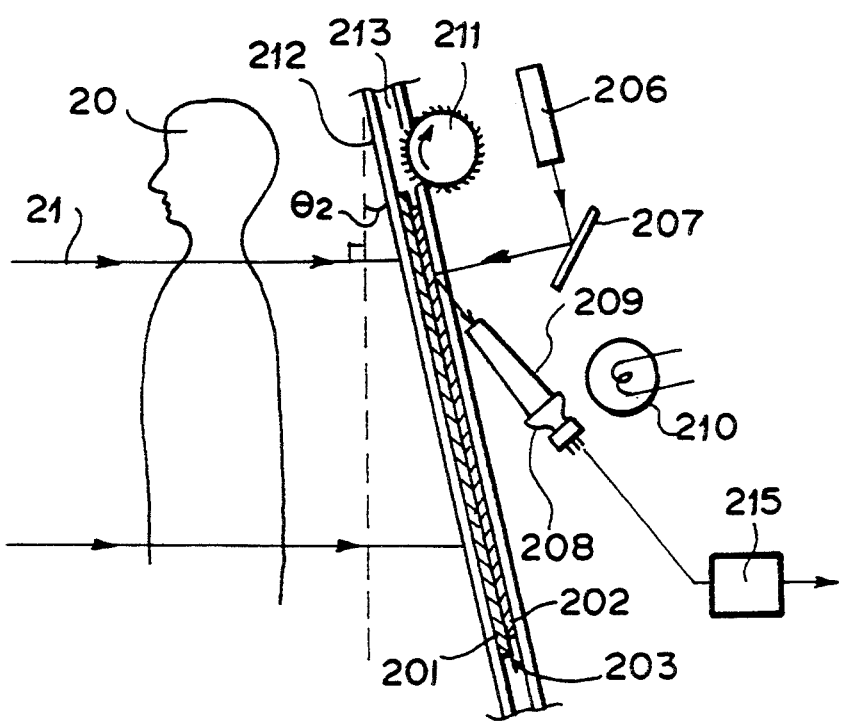
FIG. 10 is a schematic view showing a fourth embodiment of the radiation image recording and read-out apparatus in accordance with the present invention.

FIG. 10 is a schematic view showing a fourth embodiment of the radiation image recording and read-out apparatus in accordance with the present invention. In this embodiment, the sub-scanning operation is carried out by moving the stimulable phosphor sheet in the manner described above. As in the third embodiment of FIG. 9, the fourth embodiment of FIG. 10 employs a stimulable phosphor sheet 203, which is composed of a support material 201 permeable to radiation and a stimulable phosphor layer 202 overlaid on the support material 201. Also, this embodiment is provided with a radiation source, a stimulating ray source 206, a light deflector 207, a photodetector 208, a light guide member 209, an erasing light source 210, a cleaning roller 211, and a correction means 215, which are of the same types as those employed in the third embodiment of FIG. 9. However, the stimulating ray source 206, the light deflector 207, the photodetector 208, and the light guide member 209 are kept stationary. The two side edges of the stimulable phosphor sheet 203 are fitted to the central grooves 213, 213 of two vertically extending rails 212, 212. The stimulable phosphor sheet 203 can be moved down along the rails 212, 212 and along a surface, which is inclined at a predetermined angle $\theta 2$, wherein $5° \leq |\theta 2| \leq 60°$, with respect to the plane normal to the direction of travel of radiation 21 produced by a radiation source (not shown). The stimulable phosphor sheet 203 is thus moved vertically by a linear movement mechanism (not shown), such as a rack-pinion mechanism. After the stimulable phosphor sheet 203 is exposed to radiation coming from the radiation source through an object 205, and a radiation image of the object 205 is thereby stored on the stimulable phosphor sheet 203, the stimulable phosphor sheet 203 is exposed to the stimulating rays, and the radiation image is read out. At this time, as in the third embodiment of FIG. 9, the main scanning operation is carried out by the light deflector 207. The sub-scanning operation is effected by moving up the stimulable phosphor sheet 203 by use of the linear movement mechanism. When the stimulable phosphor sheet 203 is thus moved, the rotating cleaning roller 211 is kept in contact with the stimulable phosphor sheet 203 and removes dust therefrom. After the image read-out operation is finished, the stimulable phosphor sheet 203 is returned downwardly. Thereafter, the erasing light source 210 is turned on to erase the radiation image, which remains on the stimulable phosphor sheet 203 after the image signal has been obtained therefrom. The correction means 215 operates in the same manner as that in the first and third embodiments described above.

In the third and fourth embodiments described above, the stimulable phosphor layer is overlaid on the support material, which is constituted of a radiation-permeable material. Also, the stimulable phosphor layer is located on the side opposite to the radiation source with the support material intervening therebetween. However, the stimulable phosphor sheet need not necessarily be constituted in such a manner. For example, the stimulable phosphor layer may be overlaid on a support material and located on the side facing the radiation source. In such cases, after the object moves away from the surface of the stimulable phosphor sheet, the stimulating ray irradiating system and the emitted light detecting system may be moved to the vicinity of the stimulable phosphor sheet. Also, in cases where the support material is permeable to the stimulating rays and the light emitted by the stimulable phosphor sheet, the radiation source can be located facing the surface of the stimulable phosphor sheet on the side of the stimulable phosphor layer, and the emitted light detecting system can be located facing the surface of the stimulable phosphor sheet on the side of the support material.

In the embodiments described above, as the angles of inclination $\theta$, $\theta x$, $\theta y$, $\theta 1$, and $\theta 2$ are closer to 90 degrees, the image sharpness can be kept higher. However, if the angle of inclination is larger than 60 degrees, the image spread D will become very large. Also, if the angle of inclination is smaller than 5 degrees, the MTF cannot be enhanced markedly, and the image sharpness cannot be kept high.

Also, from the point of view of keeping the size of the stimulable phosphor sheet, which is used in the radiation image recording and read-out apparatus, small, the angles of inclination $\theta$, $\theta x$, $\theta y$, $\theta 1$, and $\theta 2$ should preferably fall within the range of 10 degrees to 40 degrees.

The radiation image recording and read-out apparatus in accordance with the present invention is not limited to the embodiments described above and can be embodied in various other manners disclosed in, for example, U.S. Pat. No. 4,543,479.

What is claimed is:

1. A radiation image recording and read-out method, wherein a stimulable phosphor sheet is exposed to radiation carrying image information of an object, a radiation image of the object is thereby stored on the stimulable phosphor sheet, the stimulable phosphor sheet is then exposed to stimulating rays, which cause the stimulable phosphor sheet to emit light in proportion to the amount of energy stored thereon during its exposure to the radiation, and the emitted light is photoelectrically detected, an image signal representing the radiation image being thereby obtained, the radiation image recording and read-out method comprising the steps of:
i) locating the stimulable phosphor sheet such that it may make an angle falling within the range of 5 degrees to 60 degrees, both inclusive, with respect to a plane, which is normal to the direction of travel of the radiation carrying the image information of the object, when the stimulable phosphor sheet is exposed to the radiation, and
ii) correcting the image signal, which has been obtained by photoelectrically detecting the light emitted by the stimulable phosphor sheet, in accordance with said angle.

2. A method as defined in claim 1 wherein the stimulable phosphor sheet is located such that it may make an angle falling within the range of 10 degrees to 40 degrees, both inclusive, with respect to the plane, which is normal to the direction of travel of the radiation carrying the image information of the object, when the stimulable phosphor sheet is exposed to the radiation.

3. A radiation image recording and read-out apparatus provided with:
i) a support material,
ii) at least a single stimulable phosphor sheet, which is secured to the support material and is capable of storing a radiation image thereon,
iii) an image recording section, in which the stimulable phosphor sheet is exposed to radiation carrying image information of an object, a radiation image of the object being thereby stored on the stimulable phosphor sheet, iv) an image read-out section, which is provided with:
  a) a stimulating ray source for producing stimulating rays to be irradiated to the stimulable phosphor sheet, on which the radiation image was stored in the image recording section, the stimulating rays causing the stimulable phosphor sheet to emit light in proportion to the amount of energy stored thereon during its exposure to the radiation, and
  b) a photoelectric read-out means for detecting the emitted light and obtaining an image signal representing the radiation image, v) a means for circulating and moving the stimulable phosphor sheet, which is secured to the support material, with respect to the image read-out section by repeatedly moving the support material with respect to the image read-out section, and vi) an erasing section, in which energy remaining on the stimulable phosphor sheet after the image signal has been obtained therefrom in the image read-out section is released before a next radiation image is stored on the stimulable phosphor sheet, wherein the improvement comprises the provision of:
  a) a sheet support means for supporting the stimulable phosphor sheet secured to the support material in the image recording section such that the stimulable phosphor sheet may make a predetermined angle falling within the range of 5 degrees to 60 degrees, both inclusive, with respect to a plane, which is normal to the direction of travel of the radiation carrying the image information of the object, and
  b) a correction means for correcting the image signal, which has been obtained from the image read-out section, in accordance with said predetermined angle.

4. An apparatus as defined in claim 3 wherein the angle, which the stimulable phosphor sheet supported by said sheet support means makes with respect to the plane normal to the direction of travel of the radiation carrying the image information of the object, is variable within the range of 5 degrees to 60 degrees, both inclusive, an inclination angle detector detects the angle of the stimulable phosphor sheet supported by said sheet support means, and said correction means corrects the image signal in accordance with the angle, which has been detected by said inclination angle detector.

5. An apparatus as defined in claim 3 wherein said sheet support means supports the stimulable phosphor sheet secured to the support material in the image recording section such that the stimulable phosphor sheet may make a predetermined angle falling within the range of 10 degrees to 40 degrees, both inclusive, with respect to the plane, which is normal to the direction of travel of the radiation carrying the image information of the object.

6. A radiation image recording and read-out apparatus provided with:
  i) a stimulable phosphor sheet composed of a plate-like support material and a stimulable phosphor layer, which is overlaid on the surface of the support material and is capable of storing a radiation image thereon,
  ii) an image recording section, which is located facing the stimulable phosphor sheet and in which the stimulable phosphor sheet is exposed to radiation carrying image information of an object, a radiation image of the object being thereby stored on the stimulable phosphor sheet,
  iii) an image read-out section, in which an image read-out operation is carried out and which is provided with:
    a) a stimulating ray source for producing stimulating rays to be irradiated to the stimulable phosphor sheet, on which the radiation image has been stored, the stimulating rays causing the stimulable phosphor sheet to emit light in proportion to the amount of energy stored thereon during its exposure to the radiation, and
    b) a photoelectric read-out means for detecting the emitted light and obtaining an image signal representing the radiation image,
  iv) a reciprocating movement means for reciprocally moving the stimulable phosphor sheet with respect to the image read-out section such that the image read-out operation can be carried out repeatedly in the image read-out section, and
  v) an erasing section, in which energy remaining on the stimulable phosphor sheet after the image signal has been obtained therefrom in the image read-out section is released before a next radiation image is stored on the stimulable phosphor sheet, wherein the improvement comprises the provision of:
  a) a sheet support means for supporting the stimulable phosphor sheet in the image recording section such that the stimulable phosphor sheet may make a predetermined angle falling within the range of 5 degrees to 60 degrees, both inclusive, with respect to a plane, which is normal to the direction of travel of the radiation carrying the image information of the object, and
  b) a correction means for correcting the image signal, which has been obtained from the image read-out section, in accordance with said predetermined angle.

7. An apparatus as defined in claim 6 wherein the image recording section carries out the image recording operation on the stimulable phosphor sheet from one surface side of the support material, and the image read-out section carries out the image read-out operation from the other surface side of the stimulable phosphor sheet.

8. An apparatus as defined in claim 7 wherein the stimulable phosphor sheet is kept stationary at a fixed position, and the image read-out section is moved reciprocally with respect the stimulable phosphor sheet, the image read-out operation being thereby carried out.

9. An apparatus as defined in claim 7 wherein the image read-out section is kept stationary at a fixed position, and the stimulable phosphor sheet is moved reciprocally with respect to the image read-out section, the image read-out operation being thereby carried out.

10. An apparatus as defined in claim 6 wherein the angle, which the stimulable phosphor sheet supported by said sheet support means makes with respect to the plane normal to the direction of travel of the radiation carrying the image information of the object, is variable within the range of 5 degrees to 60 degrees, both inclusive, an inclination angle detector detects the angle of the stimulable phosphor sheet supported by said sheet support means, and said correction means corrects the image signal in accordance with the angle, which has been detected by said inclination angle detector.

11. An apparatus as defined in claim 6 wherein said sheet support means supports the stimulable phosphor sheet in the image recording section such that the stimulable phosphor sheet may make a predetermined angle falling within the range of 10 degrees to 40 degrees, both inclusive, with respect to the plane, which is normal to the direction of travel of the radiation carrying the image information of the object.

12. A radiation image recording and read-out apparatus comprising:
   i) a circulation and conveyance means for conveying at least a single stimulable phosphor sheet, which is capable of storing a radiation image thereon, along a predetermined circulation path,
   ii) an image recording section, which is located in the circulation path and in which the stimulable phosphor sheet is exposed to radiation carrying image information of an object, a radiation image of the object being thereby stored on the stimulable phosphor sheet,
   iii) an image read-out section, which is located in the circulation path and provided with:
      a) a stimulating ray source for producing stimulating rays to be irradiated to the stimulable phosphor sheet, on which the radiation image was stored in the image recording section, the stimulating rays causing the stimulable phosphor sheet to emit light in proportion to the amount of energy stored thereon during its exposure to the radiation, and
      b) a photoelectric read-out means for detecting the emitted light and obtaining an image signal representing the radiation image, and
   iv) an erasing section, which is located in the circulation path and in which energy remaining on the stimulable phosphor sheet after the image signal has been obtained therefrom in the image read-out section is released before a next radiation image is stored on the stimulable phosphor sheet,
   wherein the improvement comprises the provision of:
      a) a sheet support means for supporting the stimulable phosphor sheet in the image recording section such that the stimulable phosphor sheet may make a predetermined angle falling within the range of 5 degrees to 60 degrees, both inclusive, with respect to a plane, which is normal to the direction of travel of the radiation carrying the image information of the object, and
      b) a correction means for correcting the image signal, which has been obtained from the image read-out section, in accordance with said predetermined angle.

13. An apparatus as defined in claim 12 wherein the angle, which the stimulable phosphor sheet supported by said sheet support means makes with respect to the plane normal to the direction of travel of the radiation carrying the image information of the object, is variable within the range of 5 degrees to 60 degrees, both inclusive, an inclination angle detector detects the angle of the stimulable phosphor sheet supported by said sheet support means, and said correction means corrects the image signal in accordance with the angle, which has been detected by said inclination angle detector.

14. An apparatus as defined in claim 12 wherein said sheet support means supports the stimulable phosphor sheet in the image recording section such that the stimulable phosphor sheet may make a predetermined angle falling within the range of 10 degrees to 40 degrees, both inclusive, with respect to the plane, which is normal to the direction of travel of the radiation carrying the image information of the object.

* * * * *